UNITED STATES PATENT OFFICE.

PRISCILLA FOULKE BALDWIN, OF WOOSTER, OHIO.

PROCESS OF PREPARING FOOD PRODUCTS.

1,019,411.  Specification of Letters Patent.  Patented Mar. 5, 1912.

No Drawing.  Application filed September 22, 1911. Serial No. 650,806.

*To all whom it may concern:*

Be it known that I, PRISCILLA F. BALDWIN, a citizen of the United States, residing at Wooster, in the county of Wayne and State of Ohio, have invented a new and useful Process for Preparing Food Products, of which the following is a specification.

This invention relates to a process of preparing a vegetable food product, which shall be free of starch and also incidentally includes the recovery of the starch which is washed from the vegetable matter, the starch being a valuable by-product and valuable for table use in the preparing of desserts and so forth.

In carrying out the invention I prefer to employ potatoes although any other vegetable containing a large amount of starch can be prepared in substantially the same manner and I do not wish to limit myself to the use of this one vegetable.

The process of separating the starch from he potatoes is briefly set forth as follows: After being washed and pared, the potatoes are grated or otherwise reduced to a fine consistency which work, is performed in clear water in order to avoid darkening the resulting food product, which would be the case if exposed to the air at this stage. The pulp thus formed is then placed in a suitable receptacle, such as a muslin sack and subjected to the pressure, either by squeezing with the hands or in any other desired manner, the said sack being also immersed in water, and during this stage of the process, which is for the purpose of washing out the starch, the water is changed at least three times. After the starch has been washed out the pulp can then be prepared in two ways, depending upon the form of food product it is to take. The first method consists in spreading the pulp out upon a suitable plate or other flat surface and it is then placed in an oven and dried, being stirred to prevent grounding. The dried pulp is then exposed to the air for two or three days after which it is ready to be packed for sale or shipment. Where it is desired to convert the pulp into the form of breakfast food, that is in flakes, the pulp is placed in a double cooker with a sufficient amount of water to insure cooking and after being sufficiently cooked the pulp is spread out in thin layers, a small amount of salt being added to the pulp while cooking to develop the potato flavor. The thin layers are placed in a hot oven to dry and brown, and the drying is finished in the open air. After drying it is broken up into flakes and placed in suitable packages. The thin layers of material may be scored or marked off into squares or other shapes before drying, which marking facilitates the breaking of the layers up into the form of flakes.

It will be noted that the only difference between the preparing of the pulp as a food product and converting it into flakes to be used as a breakfast food is that in the first case the pulp is not permitted to brown and is not cooked. When prepared as flakes, it is first cooked and then permitted to brown in a hot oven while drying.

Previous mention has been made of the washing of the starch from the pulp in a number of successive washings. This water is not thrown away but is all poured together, all starch which has settled in the bottom of the washing vessel during the washing process being stirred up and poured off. All of the water used in the successive washings is then permitted to stand for four or five hours and becomes very dark. This water is then carefully drained off and one or more gallons of fresh water is then poured upon the starch, and the same is then stirred in order to loosen the starch from the sides and bottom of the vessel. The water is then again drained off, being careful not to disturb the starch and after draining the starch is collected and spread out to dry. This starch should be dried in warm air or in the sun for two or three days, care being taken to protect it from flies, dirt and dust. The starch is then placed in jars until desired for use. Care must be taken to see that the starch is thoroughly dry before placing the same in jars and it may be advisable at times to allow the drying process to last longer than the time above mentioned which I have found to be the minimum time during which the starch will properly dry.

The food prepared from the pulp can be used with great benefit by invalids who have been advised not to eat starchy foods, and furnishes a pure vegetable food of considerable nutritious value and which is free from starch.

The starch obtained by this process is very white and clean looking and can be used for any purpose for which a pure vegetable starch is suited.

What I claim is:

1. The process of preparing a food product, which consists in reducing a starchy material to a pulp while immersed in water, of placing said pulp in a suitable strainer and washing it three or more times, cooking said pulp in a double cooker, a small amount of salt being added thereto, spreading the cooked pulp in thin sheets to dry, and then breaking the same into pieces for packing.

2. The process of removing starch from potatoes and forming the residue into a food product, which consists in reducing the potato to a pulp while immersed in water, washing the starch from said pulp, cooking the pulp from which the starch has been washed in a double cooker, drying and browning the same in a hot oven, and then breaking into several pieces.

PRISCILLA FOULKE BALDWIN.

Witnesses:
J. L. NOTESTEM,
C. S. SANDES.